(12) United States Patent
Shin et al.

(10) Patent No.: US 10,466,856 B2
(45) Date of Patent: Nov. 5, 2019

(54) ELECTRONIC DEVICE HAVING TWO DISPLAYS AND A METHOD FOR EXECUTING A DIFFERENT APPLICATION ON EACH DISPLAY OF THE ELECTRONIC DEVICE BASED ON SIMULTANEOUS INPUTS INTO A PLURALITY OF APPLICATION ICONS

(71) Applicant: Samsung Electronics Co., Ltd., Suwon-si, Gyeonggi-do (KR)

(72) Inventors: Sang-Min Shin, Osan-si (KR); Min-Kyu Kim, Seoul (KR); Ui-Jeong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 14/964,789

(22) Filed: Dec. 10, 2015

(65) Prior Publication Data
US 2016/0170607 A1    Jun. 16, 2016

(30) Foreign Application Priority Data

Dec. 12, 2014    (KR) ........................ 10-2014-0179648

(51) Int. Cl.
| | | |
|---|---|---|
| *G06F 3/0481* | (2013.01) | |
| *G06F 3/14* | (2006.01) | |
| *G06F 3/0484* | (2013.01) | |
| *G09G 5/14* | (2006.01) | |
| *G06F 3/0488* | (2013.01) | |

(Continued)

(52) U.S. Cl.
CPC ........ *G06F 3/04817* (2013.01); *G06F 1/1647* (2013.01); *G06F 3/0481* (2013.01); *G06F 3/0482* (2013.01); *G06F 3/0488* (2013.01); *G06F 3/04842* (2013.01); *G06F 3/1423* (2013.01); *G09G 5/14* (2013.01); *G06F 2203/04803* (2013.01); *G09G 2340/0464* (2013.01); *H04M 2250/16* (2013.01)

(58) Field of Classification Search
CPC .. G06F 3/0482; G06F 3/04817; G06F 3/0481; G06F 3/0488; G06F 3/1423; G06F 1/1647; G06F 2203/04803; G09G 5/14; G09G 2340/0464; H04M 2250/16
See application file for complete search history.

(56) References Cited

U.S. PATENT DOCUMENTS 5,564,004 A * 10/1996 Grossman ............. G06F 3/0481
                                                                715/811
2009/0015513 A1    1/2009 Kim et al.
2010/0295802 A1    11/2010 Lee
(Continued)

FOREIGN PATENT DOCUMENTS

KR    10-2009-0005828 A    1/2009
KR    10-2010-0126900 A    12/2010
(Continued)

*Primary Examiner* — Aaron Lowenberger
(74) *Attorney, Agent, or Firm* — Jefferson IP Law, LLP

(57) ABSTRACT

An electronic device is provided. The electronic device includes a first display, a second display, and a processor configured to display execution screens of applications corresponding to at least two icons on the first display and the second display, when detecting the least two icons in at least one display among the first display and the second display.

8 Claims, 17 Drawing Sheets

(51) Int. Cl.
    *G06F 3/0482*    (2013.01)
    *G06F 1/16*      (2006.01)

(56) References Cited

U.S. PATENT DOCUMENTS

| | | | | |
|---|---|---|---|---|
| 2013/0038636 | A1* | 2/2013 | Fujiwaka | G06F 1/1643 |
| | | | | 345/681 |
| 2013/0120295 | A1* | 5/2013 | Kim | G06F 3/01 |
| | | | | 345/173 |
| 2014/0325428 | A1* | 10/2014 | Lee | G06F 3/0481 |
| | | | | 715/781 |
| 2015/0199125 | A1* | 7/2015 | Tsukamoto | G06F 3/04883 |
| | | | | 715/765 |

FOREIGN PATENT DOCUMENTS

| | | |
|---|---|---|
| KR | 10-2013-0054073 A | 5/2013 |
| KR | 10-2014-0057183 A | 5/2014 |

\* cited by examiner

ELECTRONIC DEVICE HAVING TWO DISPLAYS AND A METHOD FOR EXECUTING A DIFFERENT APPLICATION ON EACH DISPLAY OF THE ELECTRONIC DEVICE BASED ON SIMULTANEOUS INPUTS INTO A PLURALITY OF APPLICATION ICONS

CROSS-REFERENCE TO RELATED APPLICATION(S)

This application claims the benefit under 35 U.S.C. § 119(a) of a Korean patent application filed on Dec. 12, 2014 in the Korean Intellectual Property Office and assigned Serial number 10-2014-0179648, the entire disclosure of which is hereby incorporated by reference.

TECHNICAL FIELD

The present disclosure relates to an electronic device and a method for executing an application by the electronic device.

BACKGROUND

An electronic device stores various applications, and displays the execution screens of the corresponding applications on a display through the selection of an icon.

The electronic device can display the execution screens of the applications in a multi-window mode by dividing a display of the electronic device into a plurality of windows.

When an electronic device having two displays, the electronic device can display execution screens of a plurality of applications through the two displays.

The above information is presented as background information only to assist with an understanding of the present disclosure. No determination has been made, and no assertion is made, as to whether any of the above might be applicable as prior art with regard to the present disclosure.

SUMMARY

In order to display execution screens of a plurality of applications through two displays, an electronic device having two displays should display an execution screen of a corresponding application through the selection of an icon on one display, and display an execution screen of a corresponding application through the selection of an icon on another display.

Aspects of present disclosure are to address at least the above-mentioned problem and/or disadvantages and to provide at least the advantages described below. Accordingly, an aspect of the present disclosure is to provide an electronic device that has a plurality of displays and is capable of executing a plurality of applications, and a method for executing an application by the electronic device.

In accordance with an aspect of the present disclosure, an electronic device is provided. The electronic device includes a first display, a second display, and a processor that may be configured to display execution screens of applications corresponding to at least two icons on the first display and the second display, when detecting the inputs of the at least two icons in the at least one display among the first display and the second display.

In accordance with another aspect of the present disclosure, a method for executing an application by an electronic device is provided. The method includes detecting inputs of at least two icons on at least one display among a first display and a second display and displaying application execution screens corresponding to the at least two icons on the first display and the second display.

An electronic device including a plurality of displays and a method for executing an application by the electronic device, according to various embodiments, can conveniently execute a plurality of applications.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
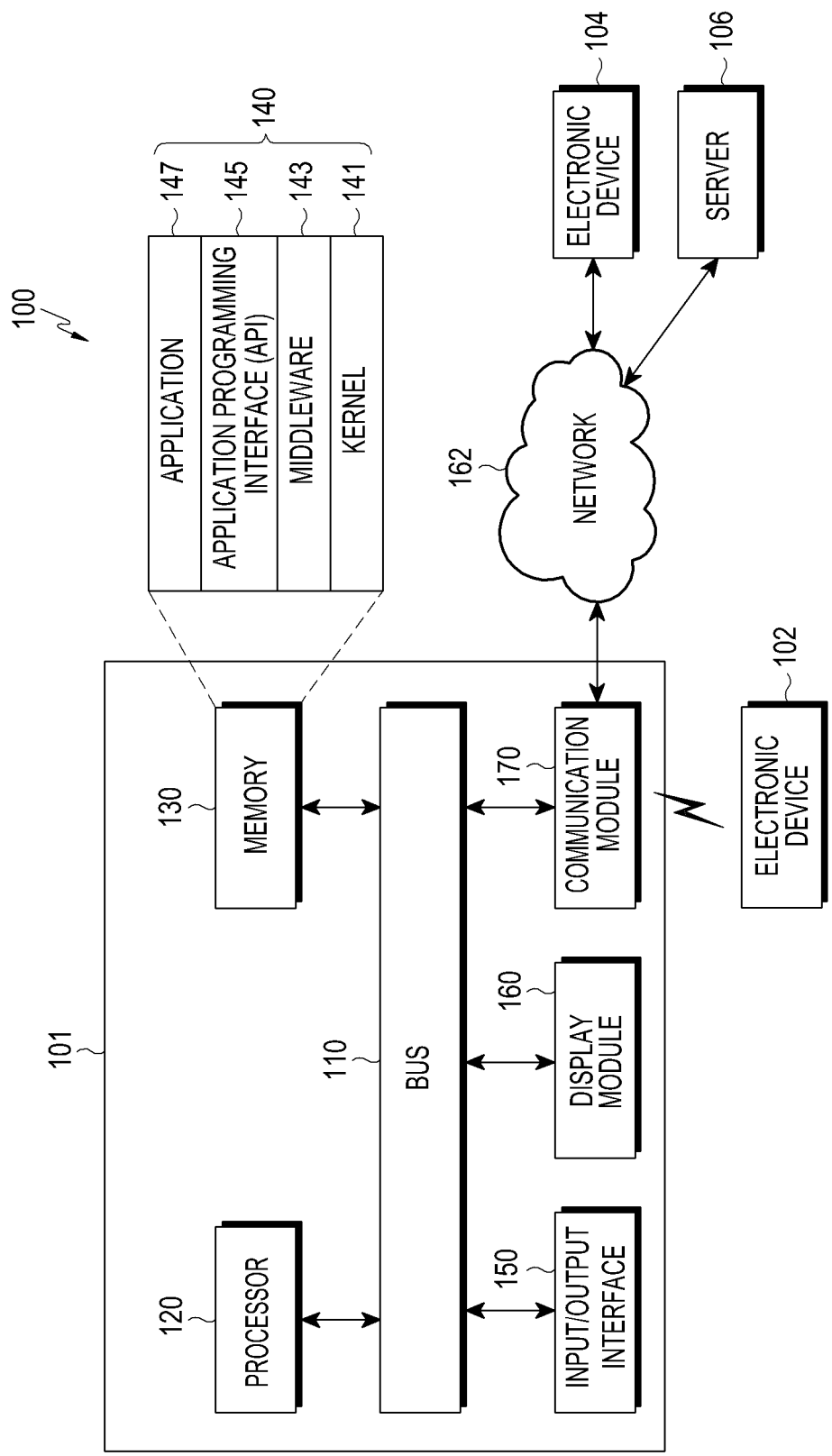
FIG. 1 illustrates a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A and/or B", or "one or more of A and/or B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

When an element (e.g., a first element) is "(operatively or communicatively) coupled with/to or connected to" another element (e.g., a second element), it should be construed that the first element is indirectly connected to the second element via yet another element (e.g., a third element). In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a digital video disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment according to various embodiments of the present disclosure.

Referring to FIG. 1, an electronic device 101 within a network environment 100 will be described. The electronic device 101 may include a bus 110, a processor 120, a memory 130, an input/output interface 150, a display 160, and a communication interface 170. In some embodiments, the electronic device 101 may omit at least some of the above components or further include other components.

The bus 110 may include, for example, a circuit for connecting the elements 110 to 170 each other and transferring communication (for example, a control message and/or data) between the elements.

The processor 120 may include one or more of a CPU, an AP, and a communication processor (CP). The processor 120 may control, for example, one or more other components of the electronic device 101 and/or process an operation or data related to communication.

The memory 130 may include a volatile memory and/or a non-volatile memory. The memory 130 may store, for example, instructions or data related to at least one other component of the electronic device 101. According to an embodiment, the memory 130 may store software and/or a program 140. The program 140, for example, may include a kernel 141, middleware 143, an application programming interface (API) 145, and/or at least one application program (or application) 147. At least some of the kernel 141, the middleware 143, and the API 145 may be referred to as an operating system (OS).

The kernel 141, for example, may control or manage system resources (for example, the bus 110, the processor 120, and the memory 130) that are used to execute an operation or a function implemented in the other programs (for example, the middleware 143, the API 145, and the application programs 147). Furthermore, the kernel 141 may provide an interface through which the middleware 143, the API 145, or the application program 147 may access individual components of the electronic device 101 to control or manage system resources.

For example, the middleware 143 may serve as a relay for allowing the API 145 or the application programs 147 to communicate with the kernel 141 to exchange data. Furthermore, in regard to task requests received from the application program 147, the middleware 143 may perform a control (for example, scheduling or load balancing) for the task requests using, for example, a method of assigning a priority for using the system resources (for example, the bus 110, the processor 120, or the memory 130) of the electronic device 101 to the application 147.

The API 145, for example, is an interface by which the application 147 control functions provided from the kernel 141 or the middleware 143, and may include, for example, at least one interface or function (for example, commands) for file control, window control, image processing, or text control.

The input/output interface 150, for example, may serve as an interface which can transmit commands or data input from the user or another external device to other component(s) of the electronic device 101. Further, the input/output interface 150 may output commands or data received from another component(s) of the electronic device 101 to the user or another external device.

The display 160 may include, for example, a liquid crystal display (LCD), a light emitting diode (LED) display, an organic LED (OLED) display, a micro electro mechanical system (MEMS) display, or an electronic paper display. The display 160 may display, for example, various types of contents (for example, text, images, videos, icons, or symbols) for users. The display 160 may include a touch screen, and may receive, for example, a touch, gesture, proximity, or hovering input using an electronic pen or a user's body part.

The communication interface 170 may configure communication between, for example, the electronic device and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), for example, as a cellular communication protocol. The wired communication may include at least one of, for example, a universal serial bus (USB), a high definition multimedia interface (HDMI), recommended standard 232 (RS-232), and a plain old telephone service (POTS). The network 162 may include at least one of communication networks such as a computer network (for example, a local area network (LAN) or a wide area network (WAN)), the Internet, or a telephone network.

Each of the first and second external electronic devices 102 and 104 may be a device which is the same as the electronic device 101, or a different kind of device. The server 106 may include one or more groups of servers. All or some of operations executed by the electronic device 101 may be executed by another or a plurality of electronic devices (for example, the electronic devices 102 and 104, or the server 106). When the electronic device 101 should perform some functions or services automatically or by a request, the electronic device 101 may make a request for performing at least some of the functions related to the functions or services to another device (for example, the electronic devices 102 and 104 or the server 106), instead of performing the functions or services by itself or additionally. Another electronic device (for example, the electronic devices 102 and 104 or the server 106) may execute the requested functions or additional functions, and transmit a result thereof to the electronic device 101. The electronic device 101 may provide the requested functions or services by processing the received result as it is or additionally. To achieve this, for example, cloud computing, distributed computing, or client-server computing technology may be used.

Figure 2:
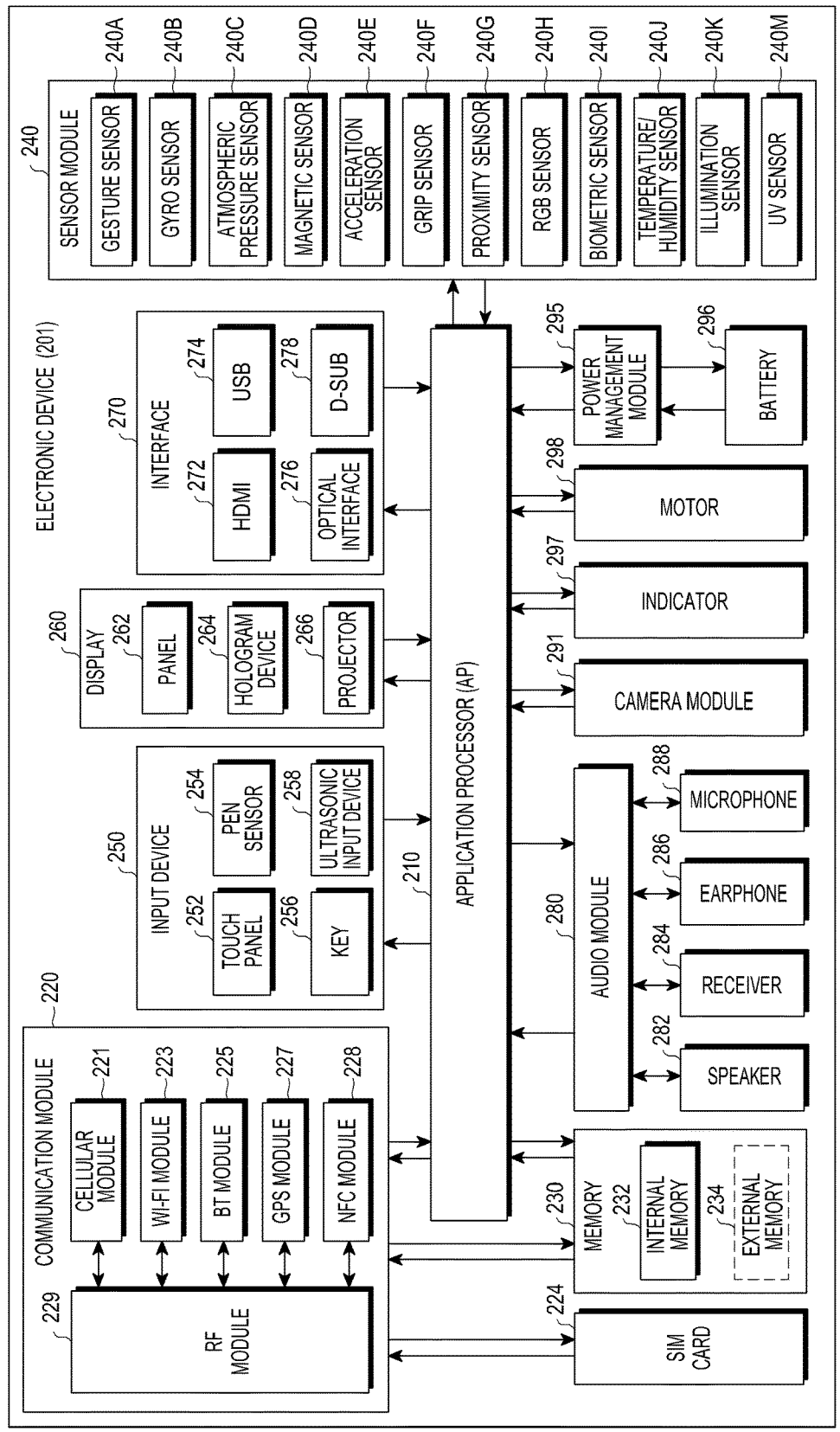
FIG. 2 illustrates a block diagram of an electronic device according to various embodiments of the present disclosure.

FIG. 2 is a block diagram of an electronic device according to various embodiments of the present disclosure.

Referring to FIG. 2, an electronic device 201 may include, for example, all or some of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210, for example, may control a plurality of hardware or software components connected thereto by driving an operating system or an application program and perform a variety of data processing and calculations. The AP 210 may be implemented as, for example, a system on chip (SoC). According to an embodiment, the AP 210 may further include a graphical processing unit (GPU) and/or an image signal processor. The AP 210 may include at least some of the components (for example, a cellular module 221) illustrated in FIG. 2. The AP 210 may load commands or data, received from at least one other component (for example, a non-volatile memory), in a volatile memory to process the loaded commands or data, and may store various types of data in a non-volatile memory.

The communication module 220 may have a configuration equal or similar to the communication interface 160 of FIG. 1. The communication module 220 may include, for example, a cellular module 221, a wireless fidelity (Wi-Fi) module 223, a Bluetooth® (BT) module 225, a GPS module 227, a near field communication (NFC) module 228, and a radio frequency (RF) module 229.

The cellular module 221 may provide a voice call, video call, text message services, or Internet services through, for example, a communication network. According to an embodiment, the cellular module 221 may perform identification and authentication of the electronic devices 201 within a communication network using a SIM (for example, the SIM card 224). According to an embodiment, the cellular module 221 may perform at least some of the functions which may be provided by the AP 210. According to an embodiment, the cellular module 221 may include a CP.

Each of the Wi-Fi module 223, the BT module 225, the GPS module 227, or the NFC module 228 may include, for example, a processor for processing data transmitted/received through a corresponding module. According to some embodiments, at least some (two or more) of the cellular module 221, the Wi-Fi module 223, the BT module 225, the GPS module 227, or the NFC module 228 may be included in one integrated chip (IC) or IC package.

The RF module 229 may transmit/receive, for example, a communication signal (for example, an RF signal). The RF module 229 may include, for example, a transceiver, a power amplifier module (PAM), a frequency filter, a low noise amplifier (LNA) or an antenna. According to another embodiment, at least one of the cellular module 221, the Wi-Fi module 223, the BT module 225, the GPS module 227, or the NFC module 228 may transmit/receive an RF signal through a separate RF module.

The SIM card 224 may include, for example, a card including a subscriber identification module and/or an embedded SIM, and contain unique identification information (for example, an integrated circuit card identifier (IC-CID)) or subscriber information (for example, an international mobile subscriber identity (IMSI)).

The memory 230 may include, for example, an internal memory 232 or an external memory 234. The internal memory 232 may include at least one of, for example, a volatile memory (for example, a dynamic random access memory (DRAM), a static RAM (SRAM), a synchronous dynamic RAM (SDRAM), and the like) and a non-volatile memory (for example, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disk drive (HDD), or a solid state drive (SSD).

The external memory 234 may further include a flash drive, for example, a compact flash (CF), a secure digital (SD), a micro-SD, a mini-SD, an extreme digital (xD), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red/green/blue (RGB) sensor), a biometric sensor 240I, a temperature/humidity sensor 240J, an illumination sensor 240K, and an ultraviolet (UV) sensor 1040M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 240 may further include a control circuit for controlling at least one sensor included therein. In some embodiments, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Further, the touch panel 252 may further include a control circuit. The touch panel 252 may further include a tactile layer, and provide a tactile reaction to a user.

The (digital) pen sensor 254, for example, may be a part of the touch panel, or may include a separate recognition sheet. The key 256 may include, for example, a physical button, an optical key or a keypad. The ultrasonic input device 258 may detect an acoustic wave using a microphone (for example, the microphone 288) of the electronic device 201 and identify data, through an input tool generating an ultrasonic signal.

The display 260 (for example, the display 160) may include a panel 262, a hologram device 264, or a projector 266. The panel 262 may include a configuration equal or similar to the display 160 of FIG. 1. The panel 262 may be, for example, flexible, transparent, or wearable. The panel 262 may also be configured to be integrated with the touch panel 252 as a single module. The hologram device 264 may show a stereoscopic image in the air by using interference of light. The projector 266 may project light onto a screen to display an image. The screen may be located, for example, in the interior or exterior of the electronic device 201. According to an embodiment, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 160 illustrated in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280 may bilaterally convert, for example, a sound and an electrical signal. At least some of components of the audio module 280 may be included in, for example, the input/output interface 140 illustrated in FIG. 1. The audio module 280 may process sound information which is input or output through, for example, a speaker 282, a receiver 284, earphones 286, the microphone 288, or the like.

The camera module 291 may capture a still image and a video. The camera module 291 may include one or more image sensors (for example, a front sensor or a back sensor), a lens, an image signal processor (ISP) or a flash (for example, LED or xenon lamp).

The power management module 295 may manage, for example, power of the electronic device 201. The power management module 295 may include a power management integrated circuit (PMIC), a charger IC, or a battery or fuel gauge. The PMIC may have a wired and/or wireless charging scheme. The wireless charging scheme may include, for example, a magnetic resonance method, a magnetic induction method, an electromagnetic method, or the like, and may further include additional circuits for wireless charging (e.g., a coil loop, a resonance circuit, a rectifier, etc.). The battery gauge may measure, for example, the remaining amount of the battery 296, a charging voltage, current, or temperature. The battery 296 may include, for example, a rechargeable battery and/or a solar battery.

The indicator 297 may show particular statuses of the electronic device 201 or a part the electronic device 201 (for example, AP 210) of the electronic device 201, such as a booting status, a message status, or a charging status. The motor 298 may convert an electrical signal into mechanical vibrations, and may generate a vibration or haptic effect. Although not illustrated, the electronic device 201 may include a processing device (for example, a GPU) for supporting mobile TV. The processing device for supporting mobile TV may process, for example, media data according to a standard of digital multimedia broadcasting (DMB), digital video broadcasting (DVB), media flow or the like.

Each of the components of the electronic device according to the present disclosure may be implemented by one or more components and the name of the corresponding component may vary depending on a type of the electronic device. The electronic device may include at least one of the above-described elements. Some of the above-described elements may be omitted from the electronic device, or the electronic device may further include additional elements. Further, some of the components of the electronic device may be combined to form a single entity, and thus, may equivalently execute functions of the corresponding elements prior to the combination.

Figure 3:
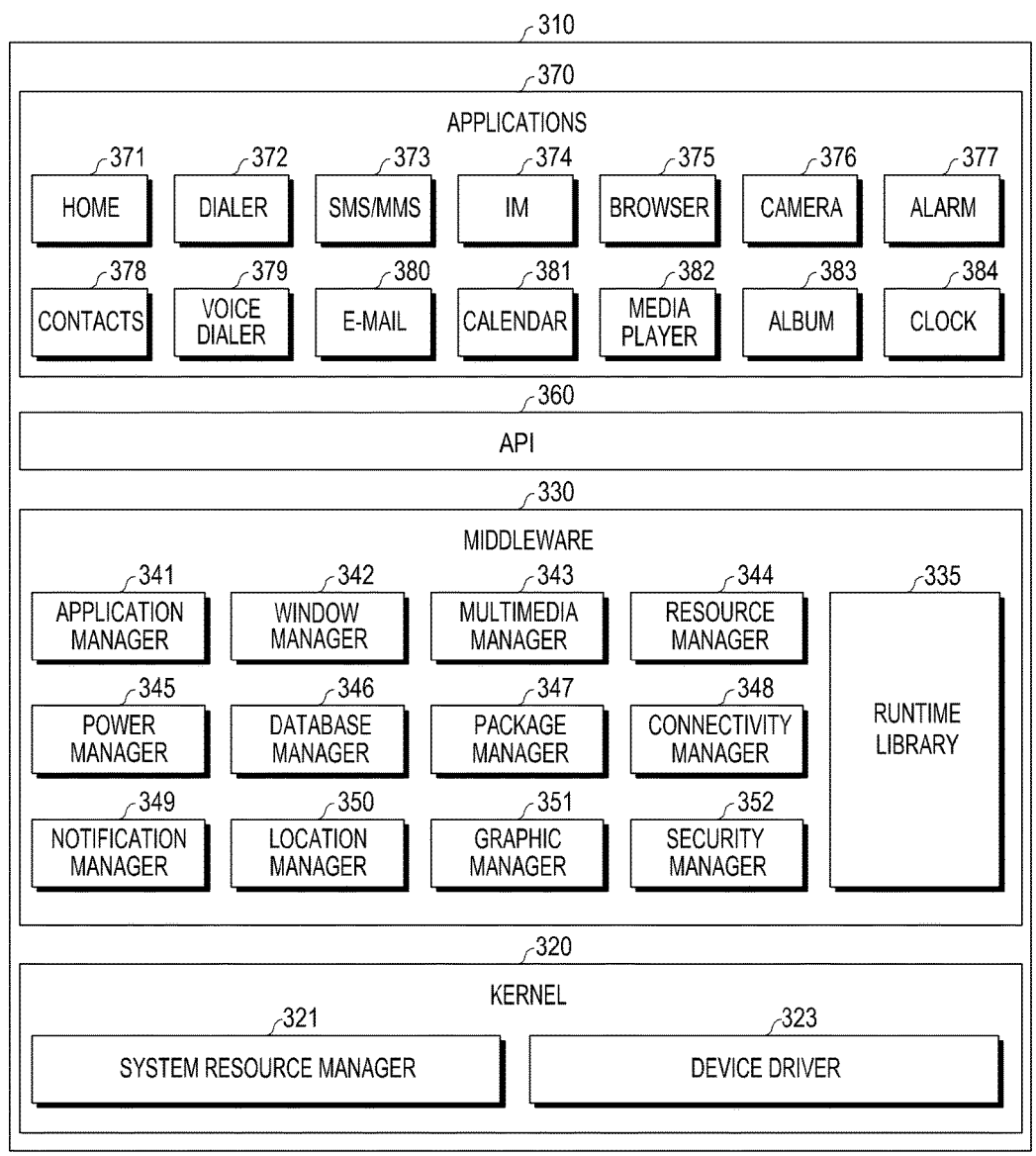
FIG. 3 illustrates a block diagram of a programming module according to various embodiments of the present disclosure.

FIG. 3 is a block diagram of an electronic device according to various embodiments of the present disclosure.

Referring to FIG. 3, a program module 310 (for example, the program 140) may include an OS for controlling resources related to the electronic device (for example, the electronic device 101) and/or various applications (for example, the application program 147) executed in the OS. The OS may be, for example, Android®, iOS®, Windows®, Symbian®, Tizen®, Bada®, or the like.

The programming module 310 may include a kernel 320, a middleware 330, an API 360, and/or an application 370. At least some of the program module 310 may be preloaded in the electronic device or downloaded from the server (for example, the server 106).

The kernel 320 (for example, the kernel 141 of FIG. 1) may include, for example, a system resource manager 321 or a device driver 323. The system resource manager 321 may control, allocate, or collect system resources. The system resource manager 321 may include a process manager, a memory manager, or a file system manager. The device driver 323 may include, for example, a display driver, a camera driver, a BT driver, a shared-memory driver, a USB driver, a keypad driver, a Wi-Fi driver, an audio driver, or an inter-process communication (IPC) driver.

The middleware 330, for example, may provide a function required by the applications 370 in common or provide various functions to the applications 370 through the API 360 so that the applications 370 may efficiently use limited system resources. The middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run time library 335 may include, for example, a library module that a compiler uses to add new functions through a programming language while the application 370 is executed. The run time library 335 may perform input/output management, memory management, or an arithmetic function.

The application manager 341 may manage, for example, a life cycle of at least one application among the applications 370. The window manager 342 may manage a graphical user interface (GUI) resource used in a screen. The multimedia manager 343 may detect a format required for reproducing various media files and encode or decode a media file using a codec appropriate for the corresponding format. The resource manager 344 may manage resources such as a source code, a memory or a storage space of the applications 370.

The power manager 345 may operate together with, for example, a basic input/output system (BIOS), to manage a battery or power and may provide power information required for the operation of the electronic device. The database manager 346 may generate, search, or change a database to be used by the applications 370. The package manager 347 may manage the installation or updating of applications distributed in the form of a package file.

For example, the connectivity manager 348 may manage wireless connections, such as Wi-Fi or BT. The notification manager 349 may display or notify of an event such as a received message, an appointment, a proximity notification, and the like to a user without disturbance. The location manager 350 may manage location information of an electronic device. The graphic manager 351 may manage graphic effects to be provided to a user and user interfaces related to the graphic effects. The security manager 352 may provide various security functions required for system security or user authentication. When an electronic device (for example, the electronic device 101) includes a call function, the middleware 330 may further include a telephony manager for managing a voice call function or a video call function of the electronic device.

The middleware 330 may include a middleware module for forming a combination of various functions of the aforementioned components. The middleware 330 may provide a module specialized for each type of OS in order to provide a differentiated function. In addition, existing components may be dynamically removed from the middleware 330, or new components may be added to the middleware 330.

The API 360 (for example, the API 145) is a set of programming functions, and a different configuration thereof may be provided according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as a home 371, a dialer 372, a short message service (SMS)/multimedia messaging service (MMS) 373, an instant messenger (IM) 374, a browser 375, a camera 376, an alarm 377, contacts 378, a voice dialer 379, an email 380, a calendar 381, a media player 382, an album 383, a clock 384, health care (for example, measure exercise quantity or blood sugar), or environment information provision (for example, provision of atmospheric pressure, humidity, or temperature information).

The applications 370 may include an application (hereinafter, referred to as an "information exchange application" for convenience of the description) supporting information exchange between the electronic device (for example, the electronic device 101) and external electronic devices (for example, the electronic devices 102 and 104). The information exchange application may include, for example, a notification relay application for transmitting predetermined information to the external electronic device, or a device management application for managing the external electronic device.

For example, the notification relay application may include a function for delivering, to the external electronic device (e.g., the electronic device 102 or 104), notification information generated by other applications of the electronic device (e.g., an SMS/MMS application, an email application, a health care application, an environmental information application, etc.). Further, the notification relay application may receive notification information from, for example, an external electronic device and provide the received notification information to a user. A device management application may manage (for example, install, delete, or update), for example, at least one function of the external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (e.g., a call service and a message service).

The applications 370 may include an application (for example, health management application) designated according to attributes (for example, attributes of the electronic device such as the type of electronic device which corresponds to a mobile medical device) of the external electronic device (for example, the electronic device 102 or 104). The applications 370 may include an application received from the external electronic device (for example, the server 106, or the electronic device 102 or 104). The applications 370 may include a preloaded application or a third party application which can be downloaded from a server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the programming module 310 may be implemented (for example, executed) by, for example, the processor (for example, the AP 210). At least some of the programming module 310 may include, for example, a module, program, routine, sets of instructions, process, or the like for performing one or more functions.

The term "module" may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

At least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a compact disc ROM (CD-ROM) and a DVD), magneto-optical media (for example, a floptical disk), a hardware device (for example, a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
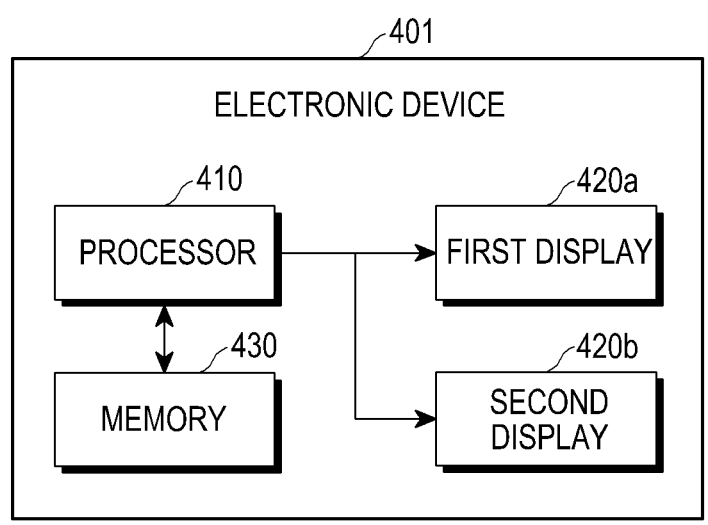
FIG. 4 is a block diagram of an electronic device for executing an application according to various embodiments of the present disclosure.

FIG. 4 is a block diagram of an electronic device for executing an application according to various embodiments of the present disclosure.

Referring to FIG. 4, an electronic device 401 (for example, the electronic device 101, 102, or 104 of FIG. 1) may include a processor 410, a first display 420a, a second display 420b, and a memory 430.

When at least one display among a plurality of displays detects inputs of at least two icons within a predetermined time, the processor 410 may control to display execution screens of applications corresponding to the at least two icons on at least one display among the plurality of displays. The processor 410 may detect the inputs of the at least two icons, for example, using a multi touch.

When a touch-down event is detected in a first icon among the at least two icons and the touch-down event is detected in a second icon before a touch-up event is detected in the first icon, the processor 410 may detect that the inputs of the first icon and the second icon have been input within a predetermined time.

When a touch-down event is detected in a first icon among the at least two icons and the touch-down event is detected in a second icon among the two icons within a predetermined time after the touch-down event is detected in the first icon, the processor 410 may detect that the inputs of the first icon and the second icon have been input within a predetermined time.

The processor 410 may detect the input of the first icon among a plurality of icons displayed in the first display 420a and the input of the second icon among a plurality of icons displayed in the second display 420b within a predetermined time. The processor 410 may control to display an execution screen of a first application corresponding to the first icon on the first display 420a, and display an execution screen of a second application corresponding to the second icon on the second display 420b.

While the execution screen of the first application using both the first display 420a and the second display 420b is displayed, the processor 410 may detect the input of the second icon among a plurality of icons displayed in the first display 420a or the second display 420b. The processor 410 may control to display the execution screen of the first application on the first display 420a, and display the execution screen of the second application corresponding to the second icon on the second display 420b. At least one application of which a UI is configured to use both the first display 420a and the second display 420b may be stored in the electronic device 410.

The processor 410 may detect the inputs of the first icon and the second icon among a plurality of icons displayed in one display among the first display 420a or the second display 420b within a predetermined time. The processor 410 may control to display the execution screen of the first application corresponding to the first icon on the first display 420a, and display the execution screen of the second application corresponding to the second icon on the second display 420b.

When the processor 410 sequentially detects the inputs of the first icon and the second icon among a plurality of icons displayed in one display among the first display 420a or the second display 420b within a predetermined time, the processor 410 may determine a type of a display according to an input order. The processor 410 may control to display the execution screen of the first application corresponding to the first icon which is preferentially input on the first display 420a, and display the execution screen of the second application corresponding to the second icon which is input next on the second display 420b.

The processor 410 may detect the inputs of the first icon and the second icon among a plurality of icons displayed in one display among the first display 420a or the second display 420b within a predetermined time. The processor 410 may detect a type of a display which can display the execution screen of the first application corresponding to the first icon and the execution screen of the second application corresponding to the second icon according to the above-mentioned input type. When a first input (e.g. a long touch) for displaying the first display 420a is detected in the first icon and a second input (e.g. a touch) for displaying the second display 420b is detected in the second icon, the processor 410 may control to display the execution screen of the first application corresponding to the first icon on the first display 420a, and display the execution screen of the second application corresponding to the second icon on the second display 420b.

While in a multi-window mode for displaying a plurality of windows in one display (e.g. the first display 420a) among the first display 420a or the second display 420b, the processor 410 may detect the inputs of the first icon and the second icon among a plurality of icons displayed in the second display 420b within a predetermined time. The processor 410 may control to display the execution screen of the first application corresponding to the first icon in a first window among a plurality of windows of the first display 420a, and display the execution screen of the second application corresponding to the second icon in a second window among a plurality of windows of the first display 420a.

When an input mode of a plurality of page screens is configured, the processor 410 may detect the input of the first icon in a first page screen among a plurality of page screens of one display (e.g. the first display 420a) among the first display 420a or the second display 420b. The input mode for the plurality of page screens is an input mode in which inputs of icons may be determined as inputs within a predetermined time, when the inputs of the icons are detected in each of a plurality of pages.

After detecting the input of the first icon, the processor 410 may detect the input of the second icon in a second page screen among a plurality of page screens of the first display 420a. After detecting the input of the first icon in the first page and then detecting the input of the second icon in the second page, the processor 410 may control to display the execution screen of the first application corresponding to the first icon on the first display 420a, and display the execution screen of the second application corresponding to the second icon on the second display 420b. The electronic device 401 may include a plurality of page screens in a standby mode, and may display at least one icon indicating a type of an application in each page screen. The plurality of page screens may include a plurality of home screens for displaying at least one icon indicating an application selected by a user in the standby mode of the electronic device 401. The plurality of page screens may include a plurality of screens for displaying an icon indicating at least one application stored in the electronic device 401 through the selection of a menu in the standby mode of the electronic device 401.

When a plurality of icons are selected in at least one display among the first display 420a or the second display 420b within a predetermined time, the processor 410 may identify whether the plurality of icons are closely located. When the plurality of icons are not closely located, the processor 410 may determine whether a frequency in which the plurality of icons are input within a predetermined time is equal to or larger than a threshold value. When the frequency in which the plurality of icons are input within a predetermined time is equal to or larger than a threshold value, the processor 410 may move other icons with reference to one icon among the plurality of icons to allow the plurality of icons to be located close each other. For example, when the plurality of icons are displayed in the same page screen, the processor 410 may automatically arrange the locations of the plurality of icons to allow the plurality of icons to be close each other. For example, when the plurality of icons exists in different page screens, the processor 410 may automatically arrange the locations of the plurality of icons to allow the plurality of icons to be all close in one page screen serving as a reference. When there is no space for adding an icon to the page screen serving as the reference, the processor 410 may move an icon, which is already being displayed on the page serving as the reference by the selection of a user, to another page screen, or cancel performing an automatic arrangement.

Each of the first display 420a and the second display 420b may include the display 160 of FIG. 1 or the display 260 of FIG. 2.

The memory 430 may include the memory 130 of FIG. 1 or the memory 230 of FIG. 2. When inputs of a plurality of icons are sequentially detected within a predetermined time, the memory 430 may store the inputs of the plurality of icons to allow a type of a display corresponding to a type of an input detected in each of the icons to be linked with the inputs of the plurality of icons.

According to various embodiments, when the processor 410 detects inputs of at least two icons in at least one display among the first display and the second display, the processor 410 may be configured to display the execution screens of the applications corresponding to the at least two icons on the first display and the second display.

According to various embodiments, when detecting the input of the first icon in the first display and the input of the second icon in the second display, the processor 410 may be configured to display an execution screen of a first application corresponding to the first icon on the first display, and display an execution screen of a second application corresponding to the second icon on the second display.

According to various embodiments, the processor 410 may be configured to display the execution screen of the first application corresponding to the first icon on the first display and the second display when detecting the input of the first icon using both the first display and the second display in the first display or the second display, and the processor 410 may be configured to display the execution screen of the first application on the first display, and display the execution screen of the second application corresponding to the second icon on the second display when detecting the input of the second icon in the first display or the second display while displaying the execution screen of the first application on the first display and the second display.

According to various embodiments, when detecting the inputs of the first icon and the second icon in the first display or the second display, the processor 410 may be configured to display the execution screen of the first application corresponding to the first icon on the first display, and display the execution screen of the second application corresponding to the second icon on the second display.

According to various embodiments, the processor 410 may be configured to identify types of inputs of the first icon and the second icon when detecting the inputs in the first display or the second display, the processor 410 may be configured to display the execution screen of the first application corresponding to the first icon on the first display when detecting a first input type in the first icon, the processor 410 may be configured to display the execution screen of the first application corresponding to the first icon on the second display when detecting a second input type in the first icon, the processor 410 may be configured to display the execution screen of the second application corresponding to the second icon on the first display when detecting the first input type in the second icon, and the processor 410 may be configured to display the execution screen of the second application corresponding to the second icon on the second display when detecting the second input type in the second icon.

According to various embodiments, when detecting the inputs of the first icon and the second icon in the second display while displaying a plurality of windows in the first display, the processor 410 may be configured to display the execution screens of the first application corresponding to the first icon and the second application corresponding to the second icon on the plurality of windows, respectively.

According to various embodiments, while in an input mode of a plurality of page screens, when detecting the input of the first icon in a first page screen of the first display or the second display, and detecting the input of the second icon in a second page screen of the first display or the second display, the processor 410 may be configured to display the execution screen of the first application corresponding to the first icon on the first display, and display the execution screen of the second application corresponding to the second icon on the second display.

According to various embodiments, the processor 410 may be configured to identify whether the first icon and the second icon are located closely to each other when detecting the input of the first icon or the second icon in the first display or the second display, the processor 410 may be configured to identify an input frequency of the first icon and the second icon when the first icon and the second icon are not located closely to each other, and the processor 410 may be configured to move the first icon and the second icon to a location in which the first icon and the second icon are close when the input frequency of the first icon and the second icon is larger than a threshold value.

Figure 5A:
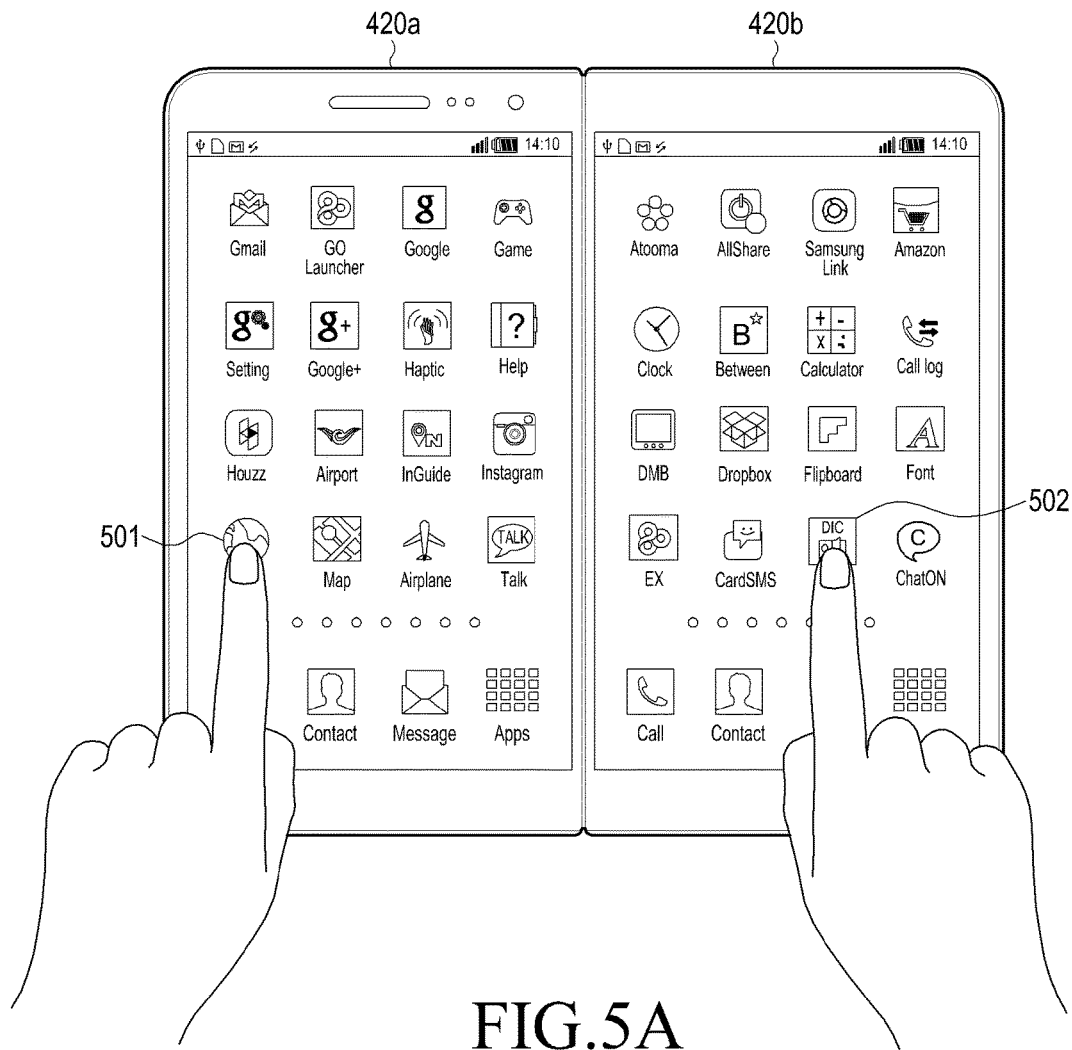
FIGS. 5A and 5B illustrate an application execution operation through a plurality of inputs generated in a plurality of displays by an electronic device according to various embodiments of the present disclosure.
Figure 5B:
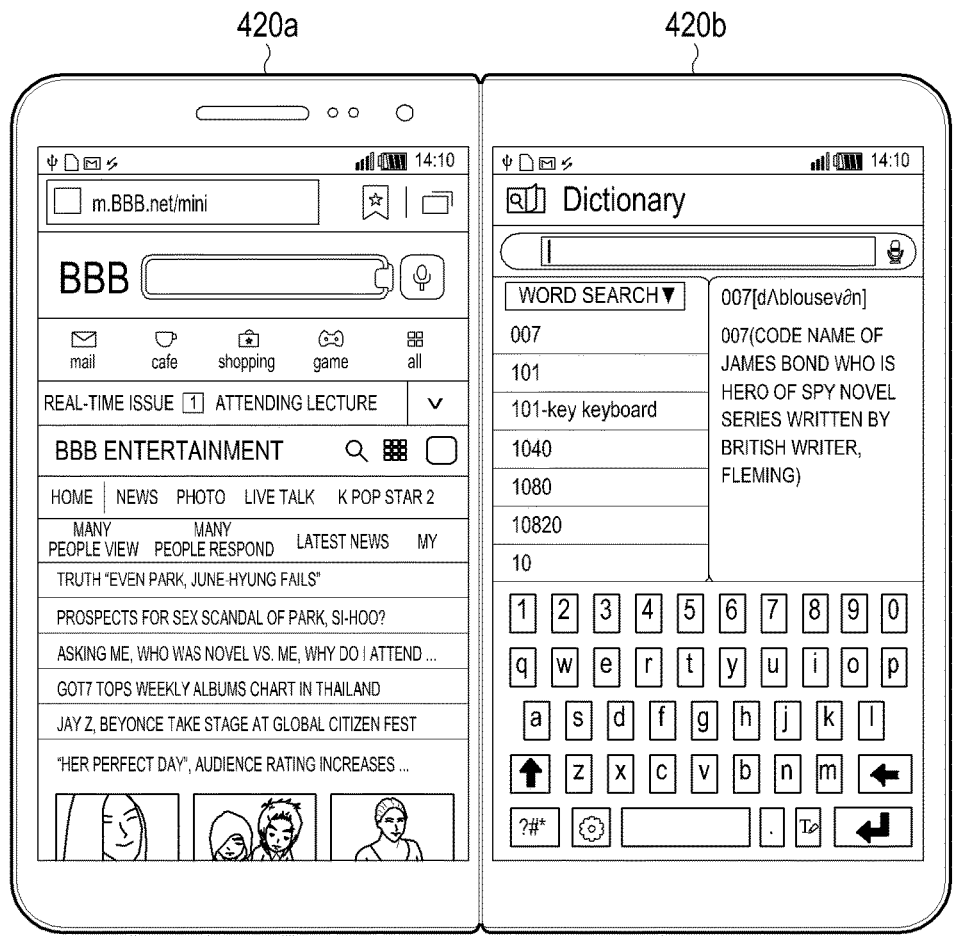

FIGS. 5A and 5B illustrate an application execution operation through a plurality of inputs generated in a plurality of displays by an electronic device according to various embodiments of the present disclosure.

Referring to FIGS. 5A and 5B, a first icon 501 indicating an Internet application may be input to one page screen among a plurality of page screens of the first display 420a, and a second icon 502 indicating a dictionary application may be input to one page screen among a plurality of page screens of the second display 420b. When the first icon 501 is input to the first display 420a within a predetermined time and the second icon 502 is input to the second display 420*b* within a predetermined time, the processor 410 may display the execution screen of the Internet application on the first display 420*a*, and display the execution screen of the dictionary application on the second display 420*b*.

Figure 6A:
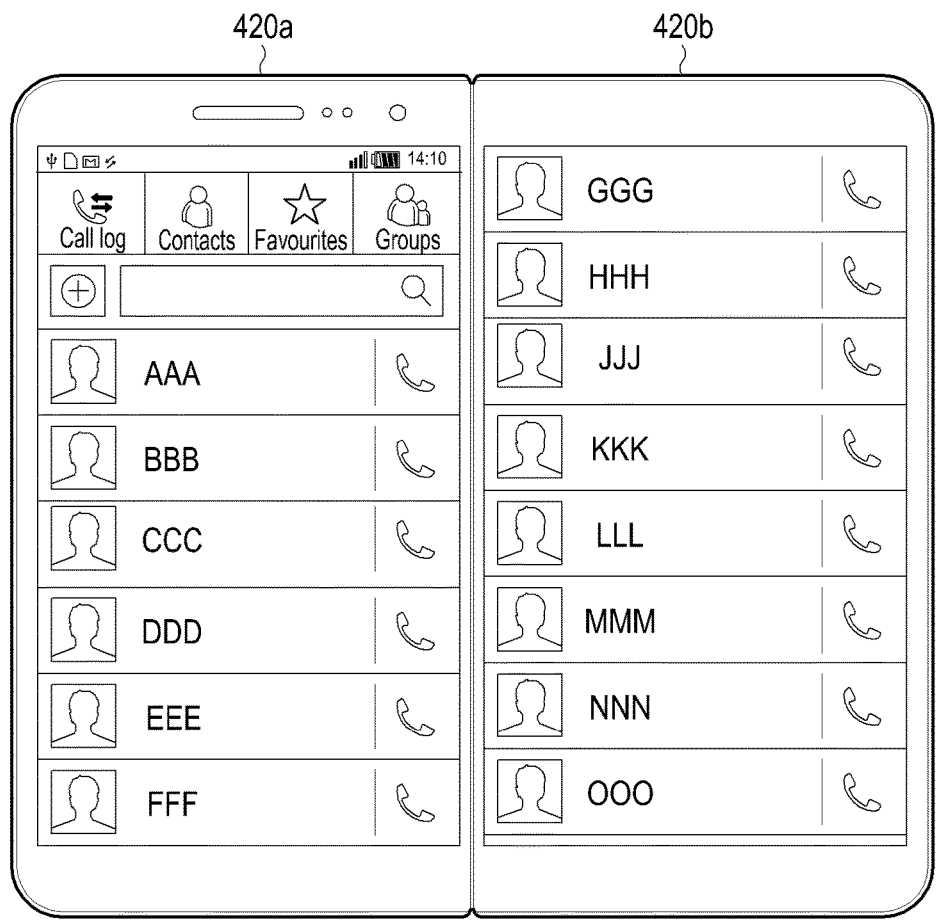
FIGS. 6A and 6B illustrate a control operation for an application using a plurality of displays by an electronic device according to various embodiments of the present disclosure.
Figure 6B:
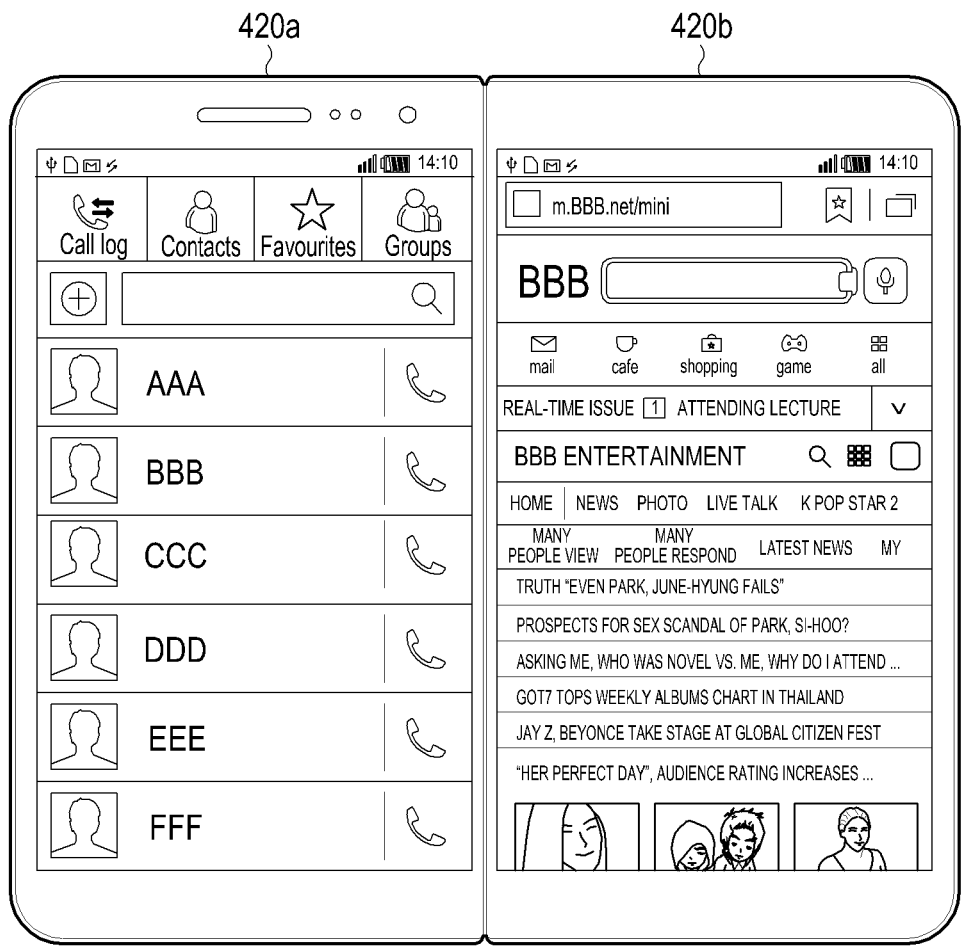

FIGS. 6A and 6B illustrate a control operation for an application using a plurality of displays by an electronic device according to various embodiments of the present disclosure.

Referring to FIGS. 6A and 6B, an execution screen of a contact application is configured to use both the first display 420*a* and the second display 420*b* can be displayed. When detecting an input of an icon indicating an Internet application in the second display 420*b* while displaying the execution screen of the contact application through the first display 420*a* and the second display 420*b*, the processor 410 may display the execution screen of the contact application on the first display 420*a*, and display the execution screen of the Internet application on the second display 420*b*.

Figure 7A:
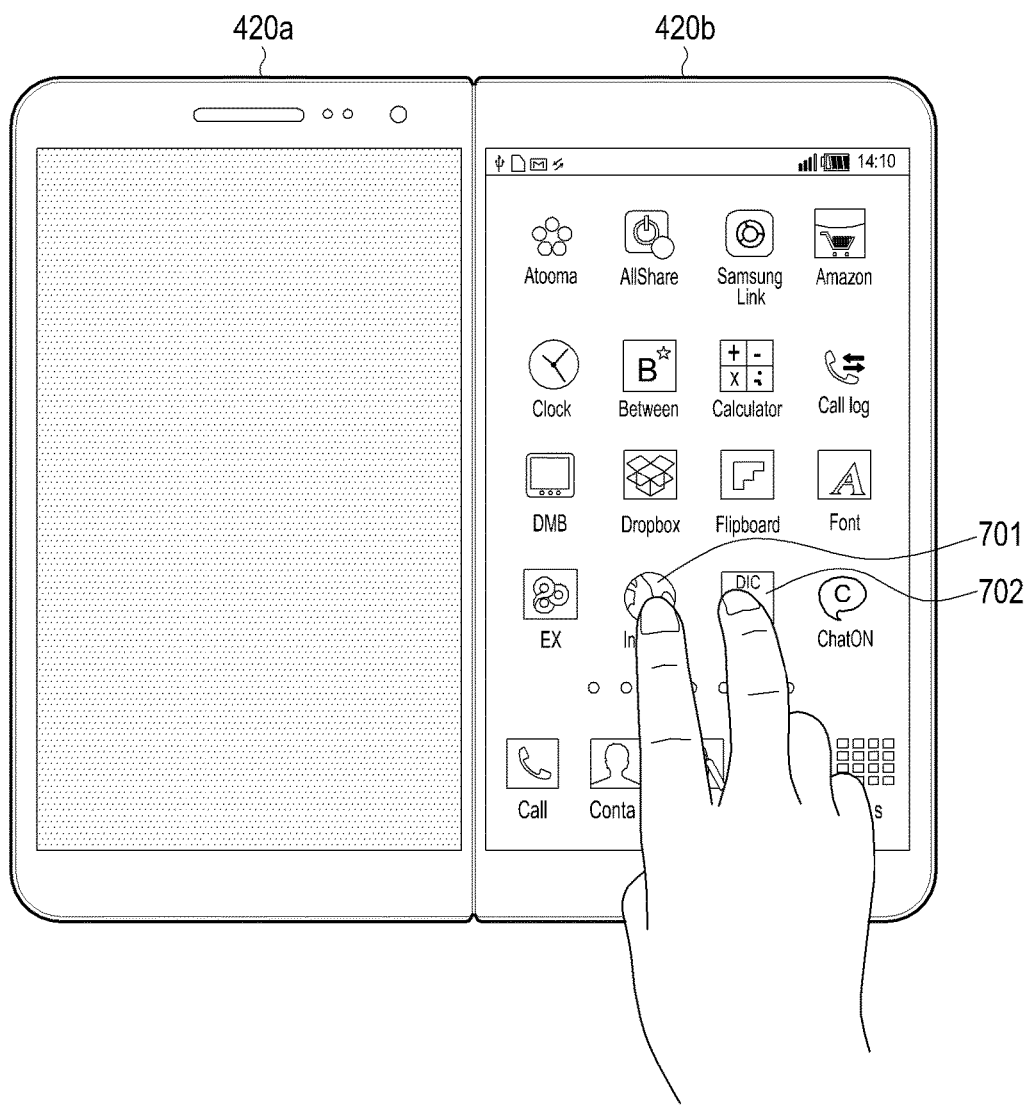
FIGS. 7A and 7B illustrate an application execution operation through a plurality of inputs generated in one display among a plurality of displays by an electronic device according to various embodiments of the present disclosure.
Figure 7B:
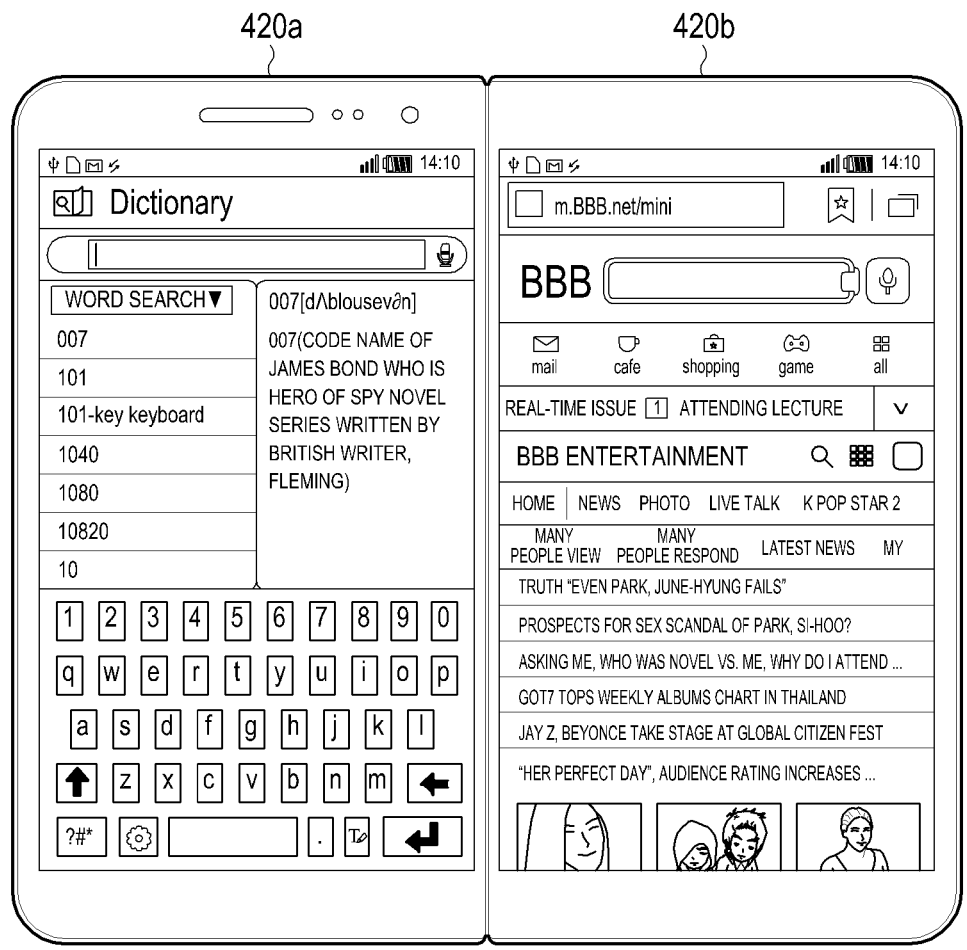

FIGS. 7A and 7B illustrate an application execution operation through a plurality of inputs generated in one display among a plurality of displays by an electronic device according to various embodiments of the present disclosure.

Referring to FIGS. 7A and 7B, a first icon 701 indicating a dictionary application and a second icon 702 indicating an Internet application may be input to one page screen among a plurality of page screens of the second display 420*b* within a predetermined time. When the first icon 701 and the second icon 702 are input to the second display 420*b* within a predetermined time, the processor 410 may display the execution screen of the dictionary application on the first display 420*a*, and display the execution screen of the Internet application on the second display 420*b*.

Figure 8:
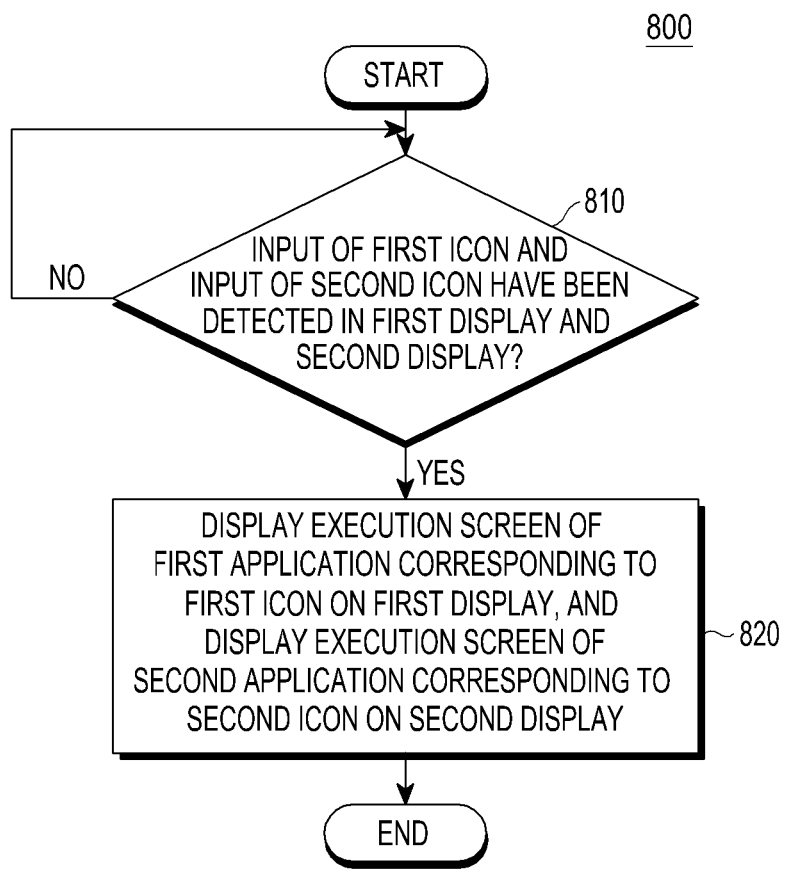
FIG. 8 is a flowchart of a method for executing an application through a plurality of inputs detected in a plurality of displays by an electronic device according to various embodiments of the present disclosure.

FIG. 8 is a flowchart of a method for executing an application through a plurality of inputs detected in a plurality of displays by an electronic device according to various embodiments of the present disclosure.

Referring to FIG. 8, a method 800 for executing the application through the plurality of inputs detected in the plurality of displays may be executed by the electronic device. Referring to FIG. 8, in operation 810, the processor may determine whether an input of a first icon is detected in the first display within a predetermined time and an input of a second icon is detected in the second display within a predetermined time. When the input of the first icon is detected in the first display within a predetermined time and the input of the second icon is detected in the second display within a predetermined time in operation 810, the processor may display the execution screen of the first application corresponding to the first icon on the first display, and display the execution screen of the second application corresponding to the second icon on the second display in operation 820.

Figure 9:
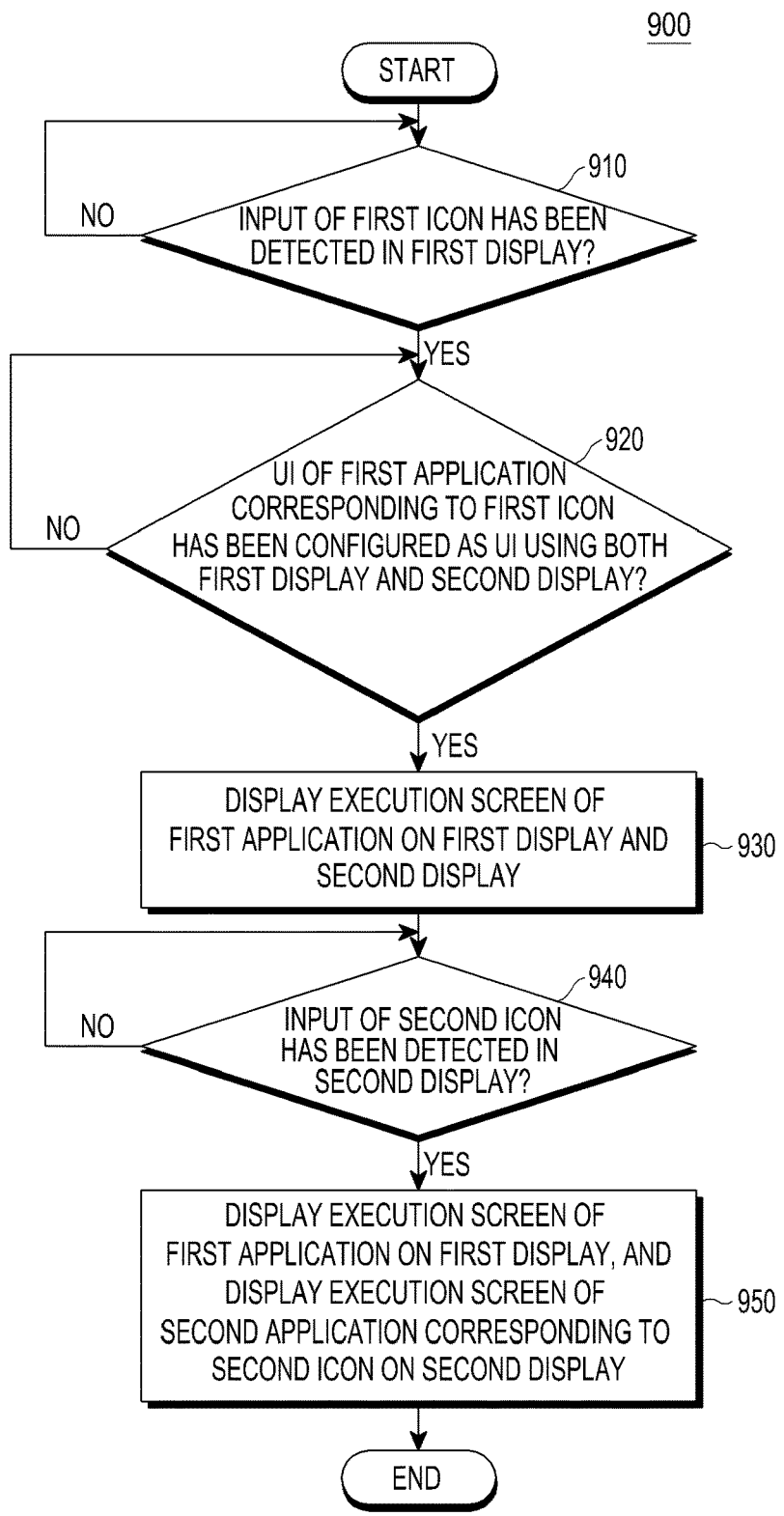
FIG. 9 is a flowchart of a method for executing an application using a plurality of displays by an electronic device according to various embodiments of the present disclosure.

FIG. 9 is a flowchart of a control method for an application using a plurality of displays by an electronic device according to various embodiments of the present disclosure.

Referring to FIG. 9, a control method 900 for the application using the plurality of displays may be executed by an electronic device. Referring to FIG. 9, in operation 910, the processor may detect an input of a first icon in the first display. When detecting the input of the first icon in the first display in operation 910, the processor may determine whether a UI has been configured to allow a first application corresponding to the first icon to use both the first display and the second display in operation 920. When determining that the UI is configured to allow the first application to use both the first display and the second display in operation 920, the processor may display the execution screen of the first application on the first display and the second display in operation 930.

While displaying the execution screen of the first application on the first display and the second display in operation 930, the processor may determine whether an input of a second icon is detected in the second display in operation 940. When detecting the input of the second icon in the second display in operation 940, the processor may display the execution screen of the first application in the first display, and display the execution screen of the second application corresponding to the second icon in the second display in operation 950.

Figure 10:
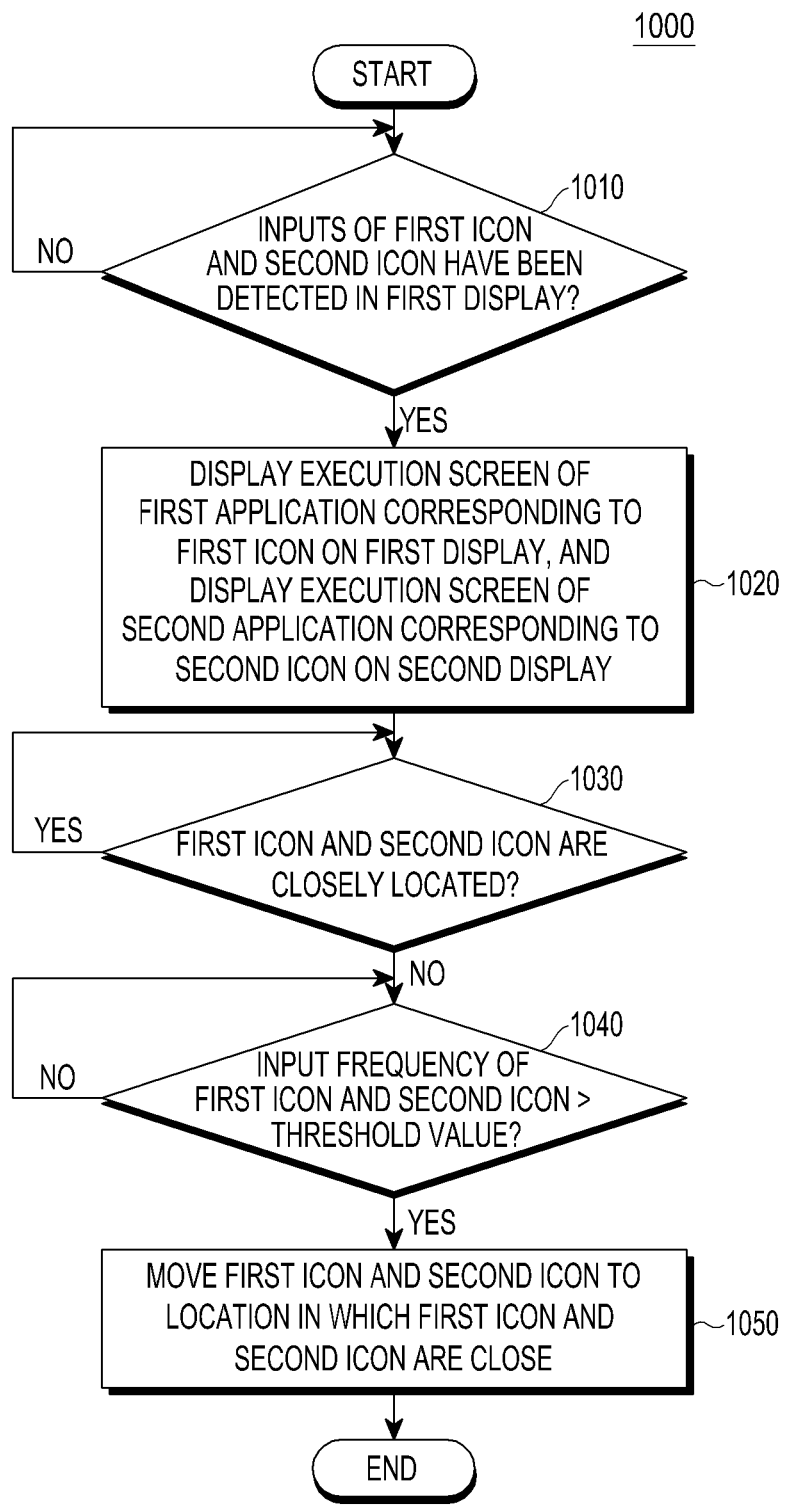
FIG. 10 is a flowchart of a method for executing an application through a plurality of inputs detected in one display among a plurality of displays by an electronic device according to various embodiments of the present disclosure.

FIG. 10 is a flowchart of a method for executing an application through a plurality of inputs detected in one display among a plurality of displays by an electronic device according to various embodiments of the present disclosure.

Referring to FIG. 10, a method 1000 for executing the application through the plurality of inputs detected in the plurality of displays may be executed by an electronic device. Referring to FIG. 10, in operation 1010, the processor may determine whether the inputs of the first icon and the second icon are detected within a predetermined time in the first display. When the inputs of the first icon and the second icon are detected in the first display within a predetermined time in operation 1010, the processor may display the execution screen of the first application corresponding to the first icon in the first display, and display the execution screen of the second application corresponding to the second icon in the second display in operation 1020.

In operation 1030, the processor may determine whether the first icon and the second icon are located closely to each other. When determining that the first icon and the second icon are not located closely to each other in operation 1030, the processor may determine whether an input frequency of the first icon and the second icon, which has been generated within a predetermined time, is equal to or larger than a threshold value in operation 1040. When determining that the input frequency of the first icon and the second icon is equal to or larger than the threshold value in operation 1040, the processor may move the first icon or the second icon to allow the first icon and the second icon to be located closely to each other in operation 1050.

Figure 11A:
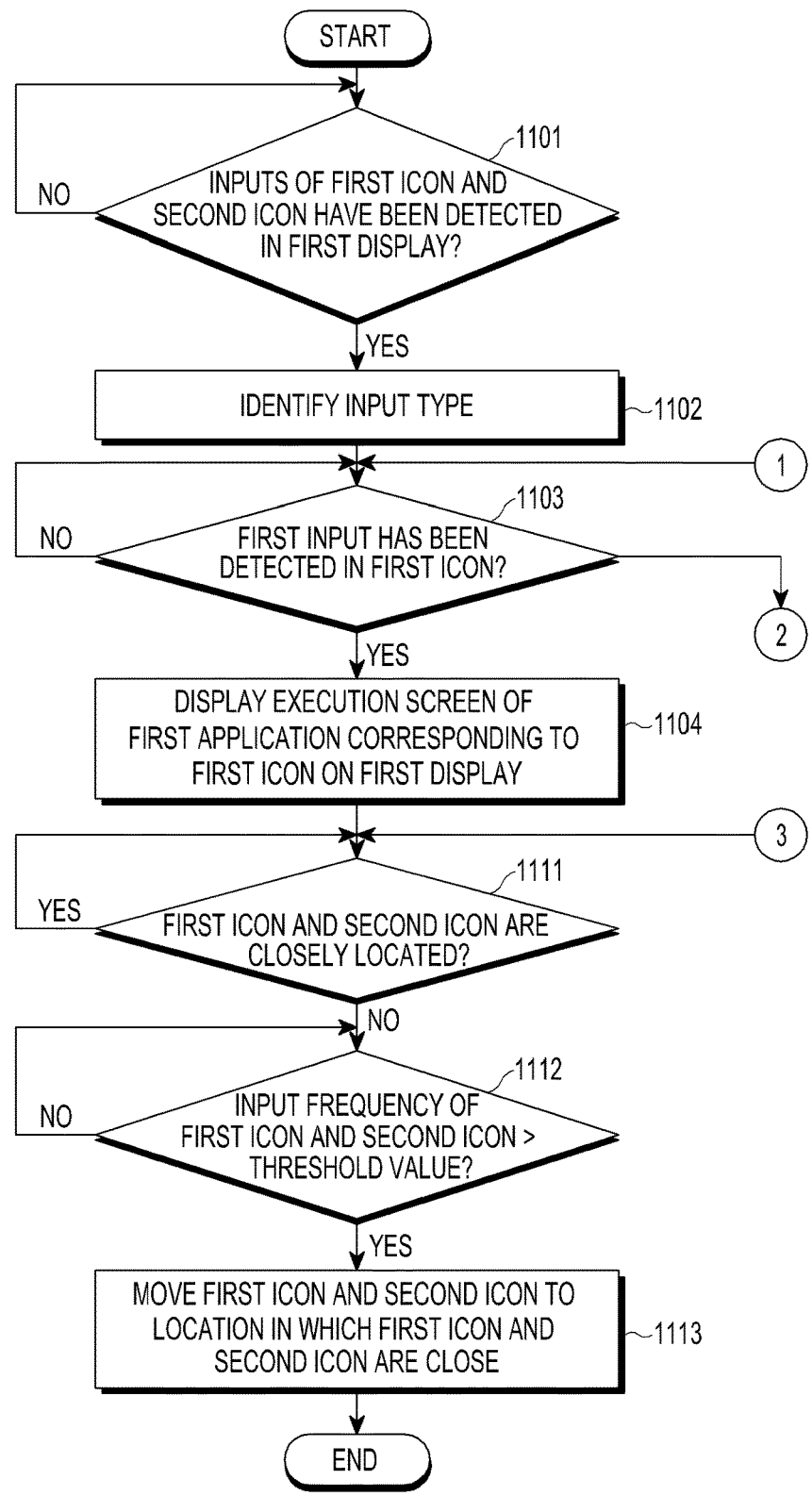
FIGS. 11A and 11B are flowcharts of a method for executing an application through a plurality of input types detected in one display among a plurality of displays by an electronic device according to various embodiments of the present disclosure.
Figure 11B:
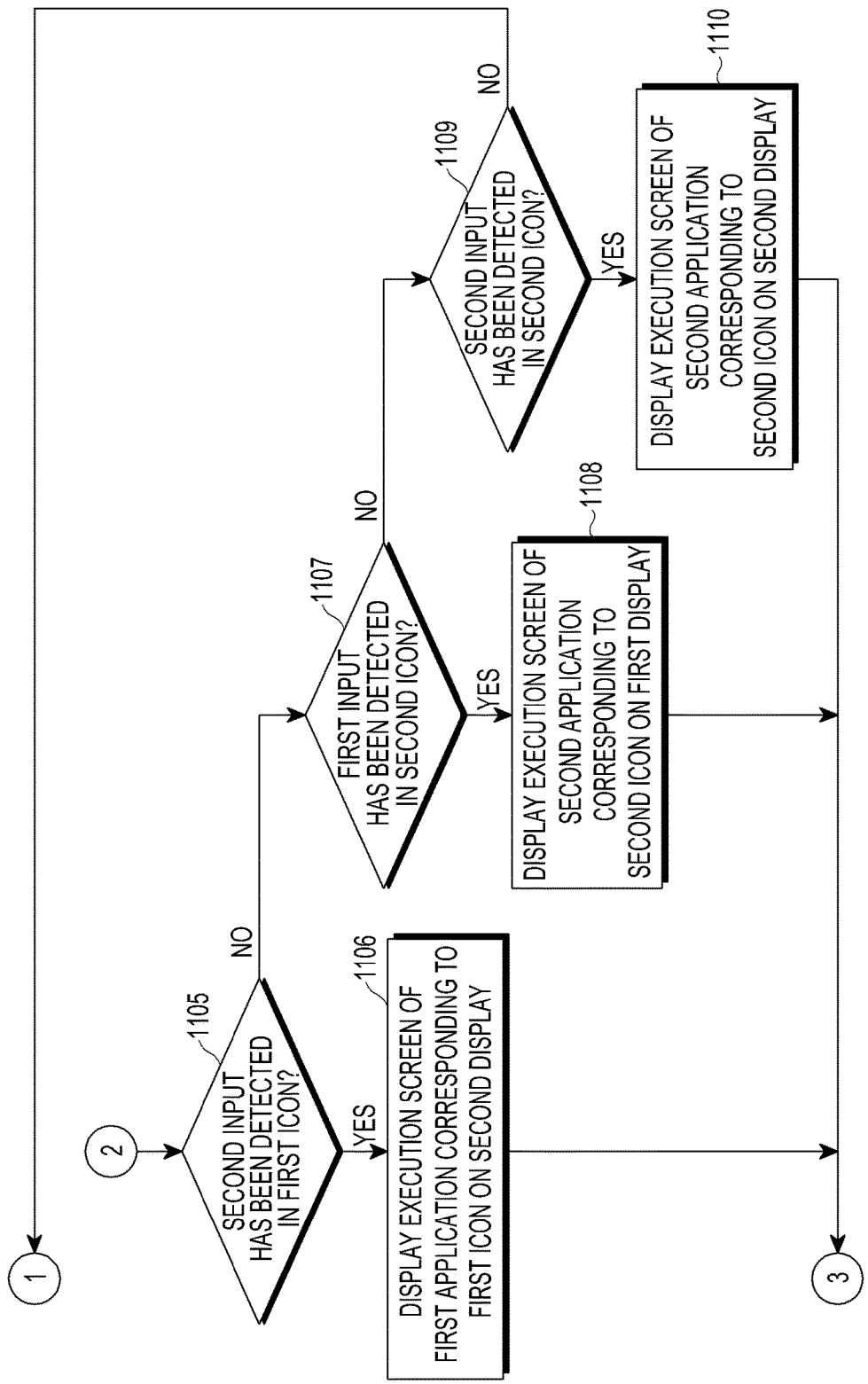

FIGS. 11A and 11B are flowcharts of a method for executing an application through a plurality of input types detected in one display among a plurality of displays by an electronic device according to various embodiments of the present disclosure.

Referring to FIGS. 11A and 11B, a method 1100 for executing the application through the plurality of inputs detected in the plurality of displays may be executed by an electronic device. Referring to FIGS. 11A and 11B, in operation 1101, the processor may determine whether the inputs of the first icon and the second icon are detected within a predetermined time in the first display. When the inputs of the first icon and the second icon are detected in the first display within a predetermined time in operation 1101, the processor may determine the types of the inputs detected in the first icon and the second icon in operation 1102.

The processor may display the execution screen of the first application corresponding to the first icon on the first display or the second display according to the types of the inputs detected in the first icon and the second icon, and display the execution screen of the second application corresponding to the second icon on the first display or the second display. When a first input for displaying the first display is detected in the first icon in operation 1103, the processor may display the execution screen of the first application corresponding to the first icon in the first display in operation 1104. When a second input for displaying the second display is detected in the first icon in operation 1105, the processor may display the execution screen of the first application corresponding to the first icon in the second display in operation 1106. When a first input for displaying the first display is detected in the second icon in operation 1107, the processor may display the execution screen of the second application corresponding to the second icon in the first display in operation 1108. When a second input for displaying the second display is detected in the second icon in operation 1109, the processor may display the execution screen of the second application corresponding to the second icon in the second display in operation 1110.

In operation 1111, the processor may determine whether the first icon and the second icon are located closely to each other. When determining that the first icon and the second icon are not located closely to each other in operation 1111, the processor may determine whether an input frequency of the first icon and the second icon, which has been generated within a predetermined time, is equal to or larger than a threshold value in operation 1112. When determining that the input frequency of the first icon and the second icon is equal to or larger than the threshold value in operation 1112, the processor may move the first icon or the second icon to allow the first icon and the second icon to be located closely to each other in operation 1113.

Figure 12:
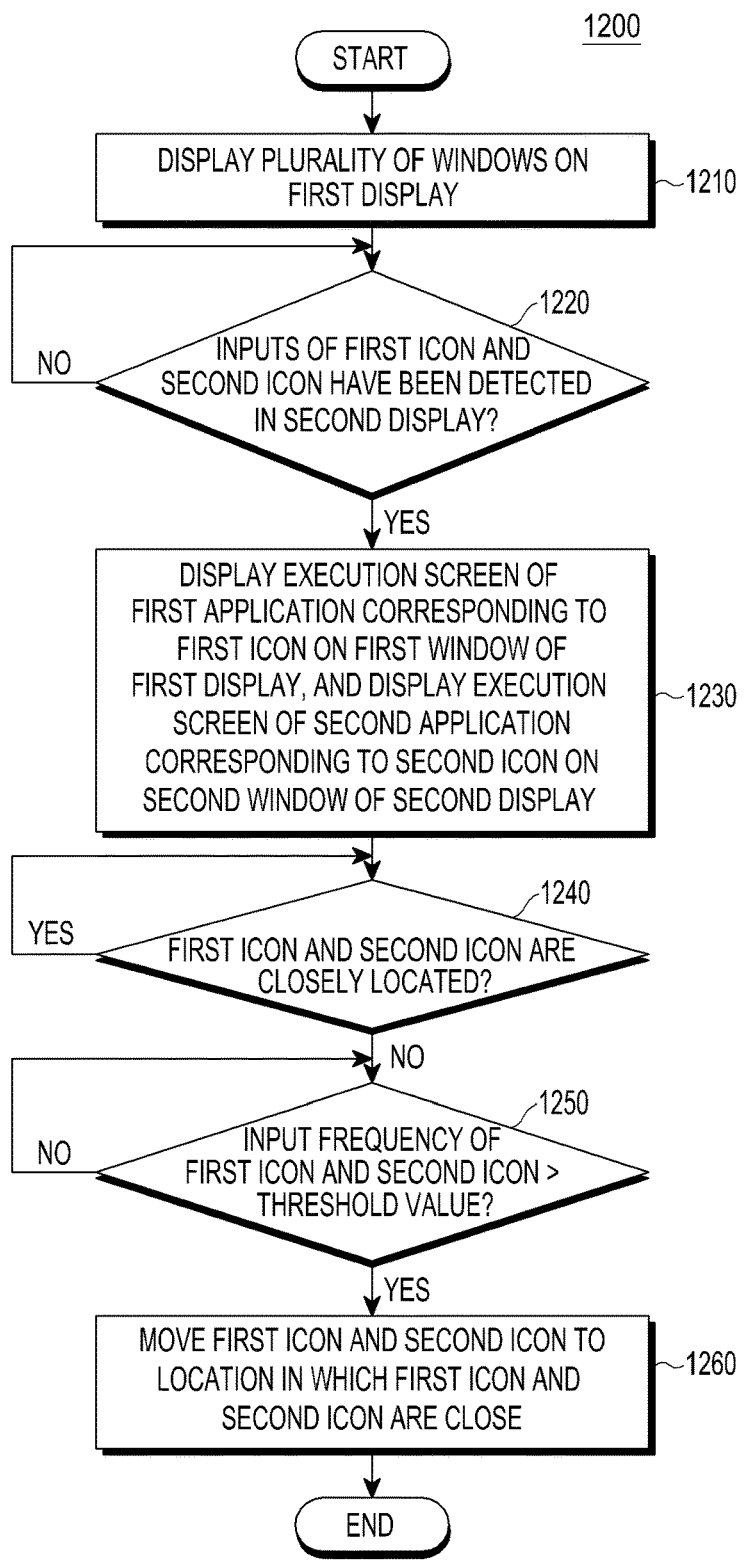
FIG. 12 is a flowchart of a method for executing an application in a multi-window mode of an electronic device having a plurality of displays according to various embodiments of the present disclosure.

FIG. 12 is a flowchart of a method for executing an application in a multi-window mode of an electronic device having a plurality of displays according to various embodiments of the present disclosure.

Referring to FIG. 12, a method 1200 for executing the application may be executed by an electronic device in the multi-window mode. Referring to FIG. 12, the processor may identify that the first display is the multi-window mode displaying a plurality of windows (e.g. a first window and a second window) in operation 1210. In operation 1220, the processor may determine whether the inputs of the first icon and the second icon have been generated in the second display within a predetermined time. When detecting that the inputs of the first icon and the second icon have been generated in the second display within a predetermined time in operation 1220, the processor may display the execution screen of the first application corresponding to the first icon on the first window of the first display, and display the execution screen of the second application corresponding to the second icon in the second window of the first display in operation 1230.

In operation 1240, the processor may determine whether the first icon and the second icon are located closely to each other. When determining that the first icon and the second icon are not closely located in operation 1240, the processor may determine whether an input frequency of the first icon and the second icon, which has been generated within a predetermined time, is equal to or larger than a threshold value in operation 1250. When determining that the input frequency of the first icon and the second icon is equal to or larger than the threshold value in operation 1250, the processor may move the first icon or the second icon to allow the first icon and the second icon to be located closely to each other in operation 1260.

Figure 13:
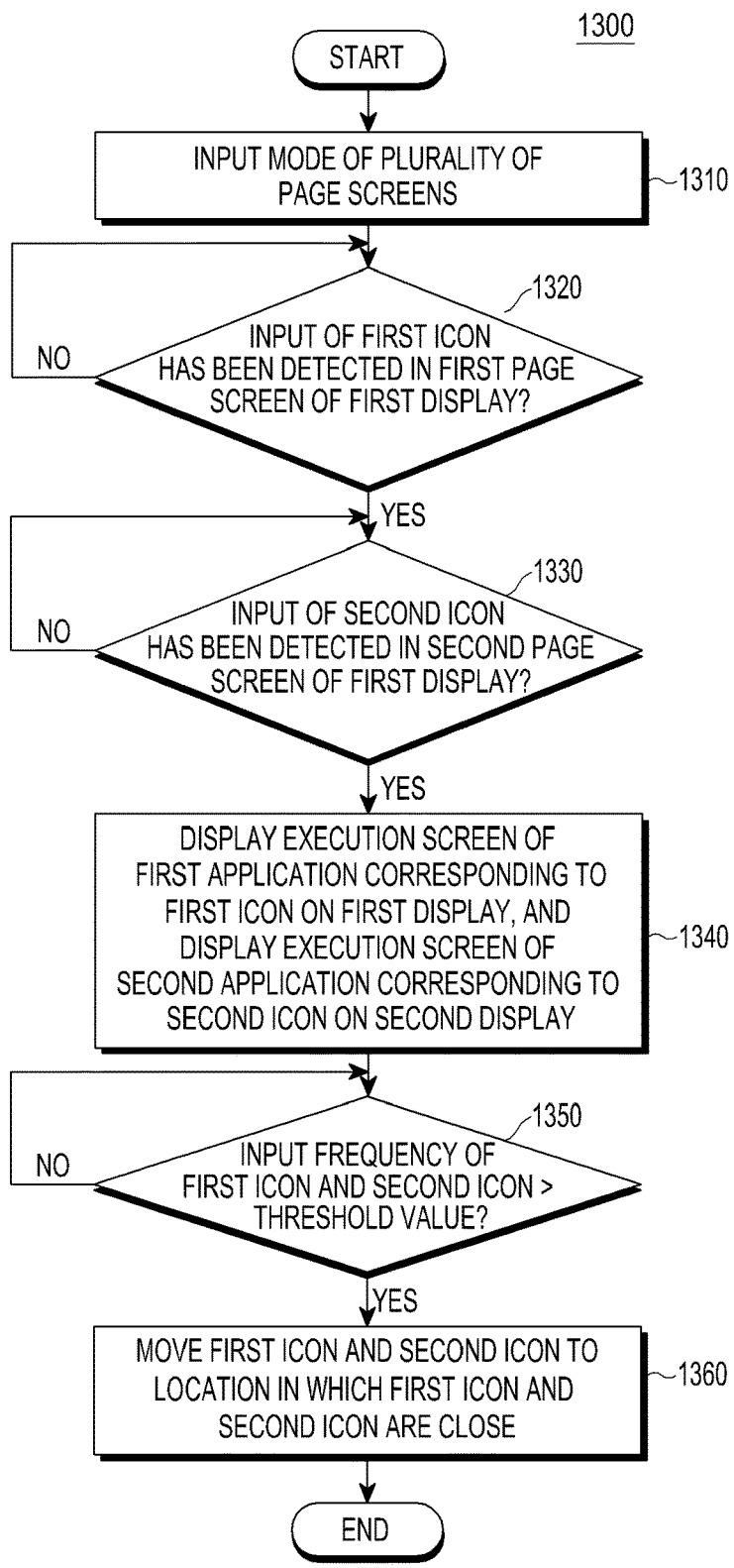
FIG. 13 is a flowchart of a method for executing an application in an input mode of a plurality of page screens according to various embodiments of the present disclosure.

FIG. 13 is a flowchart of a method for executing an application in an input mode of a plurality of page screens according to various embodiments of the present disclosure.

Referring to FIG. 13, a method 1300 for executing the application may be executed by an electronic device in the input mode for the plurality of page screens. Referring to FIG. 13, the processor may identify that the electronic device has been configured as the input mode for the plurality of page screens in operation 1310. In operation 1320, the processor may determine the input of the first icon in a first page screen among a plurality of pages of the first display. When detecting the input of the first icon in the first page screen of the first display in operation 1320, the processor may determine the input of the second icon in a second page screen among the plurality of pages of the first display in operation 1330. When detecting the input of the second icon in the second page screen of the first display in operation 1330, the processor may display the execution screen of the first application corresponding to the first icon in the first display, and display the execution screen of the second application corresponding to the second icon in the second display in operation 1340.

In operation 1350, the processor may determine whether an input frequency of the first icon and the second icon, which has been generated within a predetermined time, is equal to or larger than a threshold value. When determining that the input frequency of the first icon and the second icon is equal to or larger than the threshold value in operation 1350, the processor may move the first icon or the second icon to allow the first icon and the second icon to be located closely to each other in operation 1360.

According to various embodiments, a method for executing an application by an electronic device may include detecting inputs of at least two icons on at least one display among a first display and a second display and displaying execution screens of applications corresponding to the at least two icons on the first display and the second display.

According to various embodiments, the displaying of the execution screens of the applications may include displaying an execution screen of a first application corresponding to a first icon on the first display, and displaying an execution screen of a second application corresponding to a second icon on the second display, when detecting the input of the first icon in the first display and the input of the second icon in the second display.

According to various embodiments, the displaying of the execution screens of the applications may include displaying the execution screen of the first application corresponding to the first icon on the first display and the second display when detecting the input of the first icon using both the first display and the second display in the first display or the second display, and displaying the execution screen of the first application on the first display, and displaying the execution screen of the second application corresponding to the second icon on the second display, when detecting the input of the second icon in the first display or the second display while displaying the execution screen of the first application on the first display and the second display.

According to various embodiments, the displaying of the execution screens of the applications may include displaying the execution screen of the first application corresponding to the first icon on the first display, and displaying the execution screen of the second application corresponding to the second icon on the second display, when detecting the inputs of the first icon the second icon in the first display or the second display.

According to various embodiments, the displaying of the execution screens of the applications may include identifying types of inputs of the first icon and the second icon when detecting the inputs in the first display or the second display, displaying the execution screen of the first application corresponding to the first icon on the first display when detecting a first input type in the first icon, displaying the execution screen of the first application corresponding to the first icon on the second display when detecting a second input type in the first icon, displaying the execution screen of the second application corresponding to the second icon on the first display when detecting the first input type in the second icon, and displaying the execution screen of the second application corresponding to the second icon on the second display when detecting the second input type in the second icon.

According to various embodiments, the displaying of the execution screens of the applications may include displaying the execution screens of the first application corresponding to the first icon and the second application corresponding to the second application on a plurality of windows, respectively, when detecting the inputs of the first icon and the second icon in the second display while displaying the plurality of windows on the first display.

According to various embodiments, in an input mode of a plurality of page screens, the displaying of the execution screens of the applications may include detecting the input of the first icon in a first page screen of the first display or the second display, and detecting the input of the second icon in a second page screen of the first display or the second display, after detecting the input of the first icon, and displaying an execution screen of a first application corresponding to the first icon on the first display, and displaying an execution screen of a second application corresponding to the second icon on the second display.

According to various embodiments, the displaying of the execution screens of the applications may further include identifying whether the first icon and the second icon are located closely to each other when detecting the inputs of the first icon and the second icon in the first display or the second display, identifying an input frequency of the first icon and the second icon when the first icon and the second icon are not located closely to each other, and moving the first icon and the second icon to a location in which the first icon and the second icon are close when the input frequency of the first icon and the second icon is equal to or larger than a threshold value.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first display;
   a second display; and
   a processor configured to:
      receive a first input for selecting a first icon and a second input for selecting a second icon in the first display or in the second display, while the first icon and the second icon are displayed on the first display or the second display,
      in response to detecting the first input and the second input within a predetermined time, display a first execution screen of a first application corresponding to the first icon on the first display and a second execution screen of a second application corresponding to the second icon on the second display,
      determine whether the first icon and the second icon are displayed within a threshold distance of each other when receiving the first input and the second input in the first display or the second display,
      determine an input frequency of the first icon and the second icon in response to determining that the first icon and the second icon are not displayed within the threshold distance of each other, and
      move at least one of the first icon or the second icon to be displayed within the threshold distance in response to determining that the input frequency of the first icon and the second icon is equal to or larger than a threshold value when one of the first execution screen or the second execution screen is removed.

2. The electronic device of claim 1, wherein the processor is further configured to:
   display a third execution screen for a third application corresponding to a third icon on both the first display and the second display according to a third input for selecting the third icon.

3. The electronic device of claim 1, wherein the processor is further configured to display the first execution screen and the second execution screen on a plurality of windows, respectively, when receiving the first input and the second input while displaying the plurality of windows on the first display.

4. A method for executing an application by an electronic device, the method comprising:
   receiving a first input for selecting a first icon and a second input for selecting a second icon in a first display or a second display, while the first icon and the second icon are displayed on the first display or the second display;
   in response to detecting the first input and the second input within a predetermined time, displaying a first execution screen of a first application corresponding to the first icon on the first display and a second execution screen of a second application corresponding to the second icon on the second display;
   determining whether the first icon and the second icon are displayed within a threshold distance of each other when receiving the first input and the second input in the first display or the second display;
   determining an input frequency of the first icon and the second icon in response to determining that the first icon and the second icon are not displayed within the threshold distance of each other; and
   moving at least one of the first icon or the second icon to be displayed within the threshold distance in response to determining that the input frequency of the first icon and the second icon is equal to or larger than a threshold value when one of the first execution screen or the second execution screen is removed.

5. The method of claim 4, further comprising:
   displaying a third execution screen for a third application corresponding to a third icon on both the first display and the second display according to a third input for selecting the third icon.

6. The method of claim 4, wherein the displaying of the first execution screen comprises displaying the first execution screen and the second execution screen on a plurality of windows, respectively, in response to receiving the first input and the second input while displaying the plurality of windows on the first display.

7. The method of claim 4, wherein the displaying of the first execution screen and the displaying of the second execution screen comprise:
   receiving the first input in a first page screen of the first display or the second display, in an input mode of a plurality of page screens;

receiving the second input in a second page screen of the first display or the second display, after receiving the first input; and in response to the receiving of the first input and the second input:

displaying the first execution screen on the first display, and displaying the second execution screen on the second display.

8. A non-transitory computer-readable recording medium in which instructions are stored for executing at least one operation, the instructions being configured to cause at least one processor to:

receive a first input for selecting a first icon and a second input for selecting a second icon in a first display or a second display, while the first icon and the second icon are displayed on the first display or the second display, and in response to detecting the first input and the second input within a predetermined time, display a first execution screen of a first application corresponding to the first icon on the first display and a second execution screen of a second application corresponding to the second icon on the second display, determine whether the first icon and the second icon are displayed within a threshold distance of each other when receiving the first input and the second input in the first display or the second display, determine an input frequency of the first icon and the second icon in response to determining that the first icon and the second icon are not displayed within the threshold distance of each other, and move at least one of the first icon or the second icon to be displayed within the threshold distance in response to determining that the input frequency of the first icon and the second icon is equal to or larger than a threshold value when one of the first execution screen or the second execution screen is removed.

\* \* \* \* \*